United States Patent [19]
Mayberry

[11] Patent Number: 5,193,720
[45] Date of Patent: Mar. 16, 1993

[54] VEHICULAR DISPENSING APPARATUS

[75] Inventor: Charles C. Mayberry, Harvard, Ill.

[73] Assignee: Fluid Management Limited Partnership, Wheeling, Ill.

[21] Appl. No.: 762,590

[22] Filed: Sep. 19, 1991

[51] Int. Cl.⁵ .............................................. B67D 5/64
[52] U.S. Cl. ..................... 222/160; 222/135; 222/608; 222/180; 222/325; 414/459
[58] Field of Search ...................... 222/129, 135, 144.5, 222/145, 160, 180, 183, 318, 325, 372, 383, 608, 609; 414/459, 460

[56] References Cited

U.S. PATENT DOCUMENTS

| | | | |
|---|---|---|---|
| 2,105,990 | 1/1938 | Schultz et al. | 222/325 |
| 2,346,457 | 4/1944 | Sackett | 222/180 |
| 2,706,057 | 4/1955 | Belding | 414/459 |
| 3,185,348 | 5/1965 | Pollak et al. | 222/183 X |
| 3,976,227 | 8/1976 | Ray | 222/608 X |
| 4,271,987 | 6/1981 | Eriksson et al. | 222/160 |
| 4,928,853 | 5/1990 | Isham et al. | 222/608 X |
| 5,056,686 | 10/1991 | Jarrett | 222/325 X |
| 5,088,874 | 2/1992 | Quittner | 414/459 X |

Primary Examiner—Kevin P. Shaver
Attorney, Agent, or Firm—Fitch, Even, Tabin & Flannery

[57] ABSTRACT

A vehicular cart with a lifting collar is rolled over a plurality of containers located on a floor of a work site. The lifting collar is lowered onto the containers and is raised along with the containers to an operating position. Mixing and dispensing equipment carried on the cart are removably connected to each container. Computer control for the mixing and dispensing operations is provided, and interfaces with the mixing and dispensing apparatus coupled to each container.

11 Claims, 5 Drawing Sheets

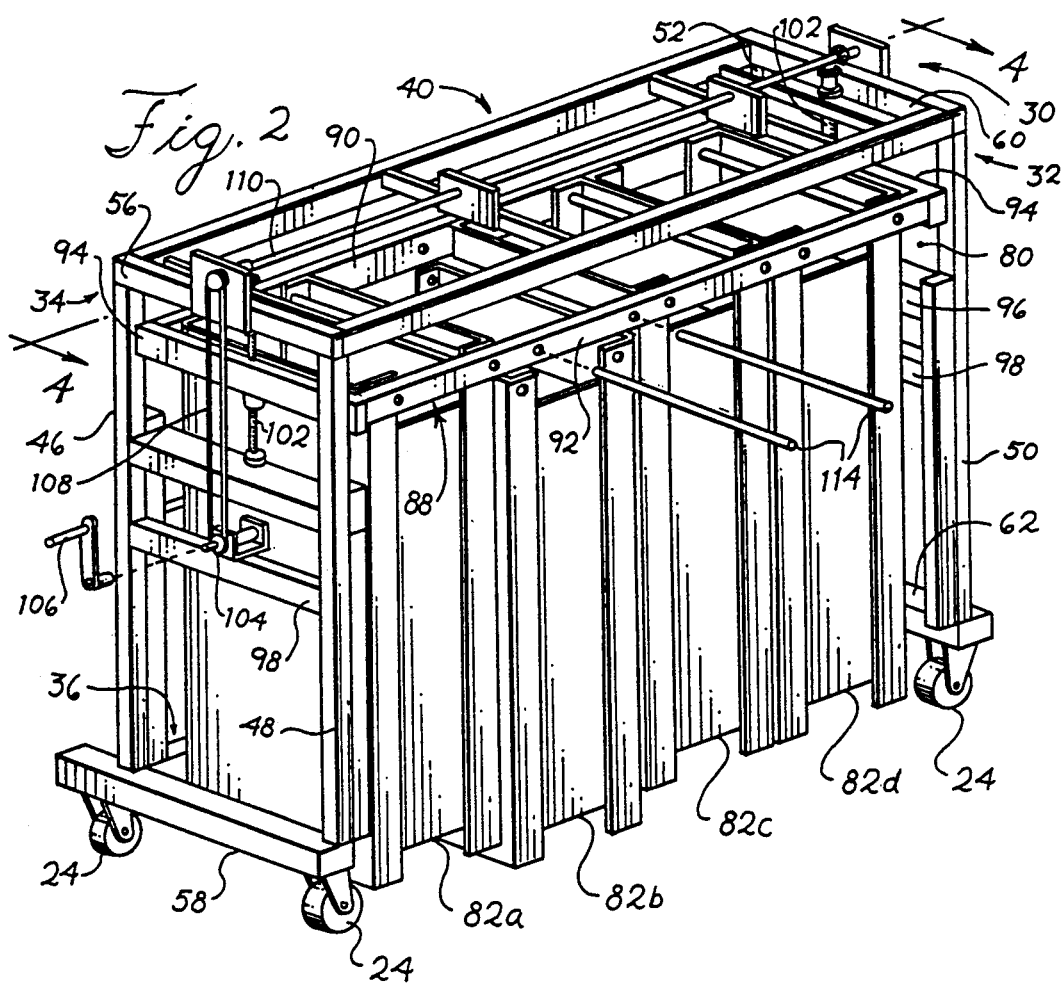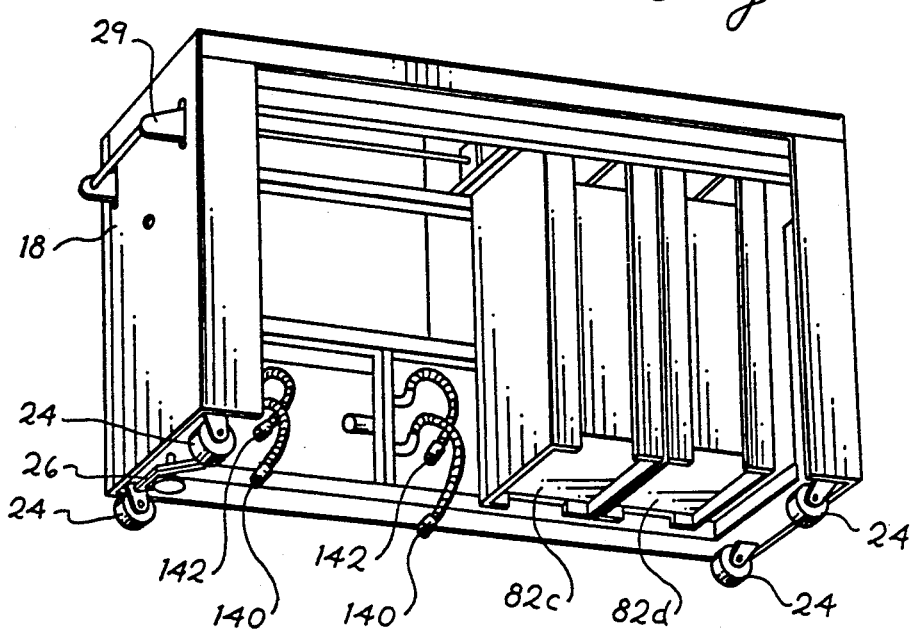

VEHICULAR DISPENSING APPARATUS

BACKGROUND OF THE INVENTION

1. Field of the Invention

The present invention pertains to dispensing apparatus for liquid and pulverulent materials, especially paints and coatings, and in particular to such apparatus incorporated into a vehicular structure.

2. Description of the Related Art

Various industries utilizing liquid and pulverulent materials have sought for improvements in the packaging and transport of those materials. The paint and coatings industries, for example, have long shipped products in sealed cans. Domestically, the larger cans have traditionally been of a one-gallon or five-gallon size but more recently five gallon plastic pails are employed.

Challenges have arisen in providing an efficient distribution of two-part coating compositions, such as epoxy enamel and similar types of coatings, requiring the mixture of two or more components immediately prior to their application at a work site. For larger jobs, cans containing the mixture parts are emptied into a mixing receptacle at a work site. Smaller jobs may however require amounts that are considerably smaller than those allotted to a conventional shipping container. For example, it may not always be convenient to mix an entire gallon or quart of a particular composition if smaller amounts are required. Due to the short working life of the mixed composition, any mixed amount not used will be wasted. If a workman attempts to mix less than a full container, the question inevitably arises as to whether the desired mixing ratios have been maintained. Upon initial consideration one may think that such problems of mixing small quantities on demand would arise only in relatively small jobs, such as small residential projects, for example. However, the issue arises in very large jobs such as coating the floors, walls, or other portions of an entire commercial building. It is customary in such larger jobs to employ a number of workmen, to start at different parts of the building. Thus, each workman may be regarded as being assigned to an individual, smaller job. A need has arisen for providing accurate mixing of liquid and pulverulent materials in the field, on site, and on demand. The need has also arisen to reduce the use of traditional shipping containers, such as paint cans, as much as possible.

SUMMARY OF THE INVENTION

It is an object according to the present invention to provide mobile dispensing equipment which can mix liquid and pulverulent materials at virtually any desired location, and in any particular quantity desired.

It is a further object according to the present invention to provide a vehicular dispensing apparatus accommodating bulk containers of a product to be mixed.

These and other objects according to the present invention which will become apparent from studying the appended description and drawings ar provided in a liquid dispensing apparatus for transporting at least one liquid container having an upper end and means at the upper end for lifting the container and for dispensing the contents of the liquid container, comprising:

vehicular frame means rollable from place to place, having a pair of end walls, and a mounting wall and top wall between the end walls and cooperating therewith to define a partially enclosed cavity for receiving a container when the frame means is rolled over the container;

valve means carried on said frame means including means for coupling to a container;

a lifting collar carried on said vehicular frame means so as to be raised and lowered toward and away from the container;

attaching means for releasably attaching the container to said lifting collar; and lifting means associated with said vehicular frame means for selectively lowering said collar adjacent said container upper end and for raising said collar and container in preparation for transport of said container.

BRIEF DESCRIPTION OF THE DRAWINGS

FIG. 2 is a perspective view showing the rear portion of the apparatus of FIG. 1, with the outer covering removed;

FIG. 9 is rear perspective view of the vehicular dispensing apparatus.

DETAILED DESCRIPTION OF THE PREFERRED EMBODIMENT

Figure 1:
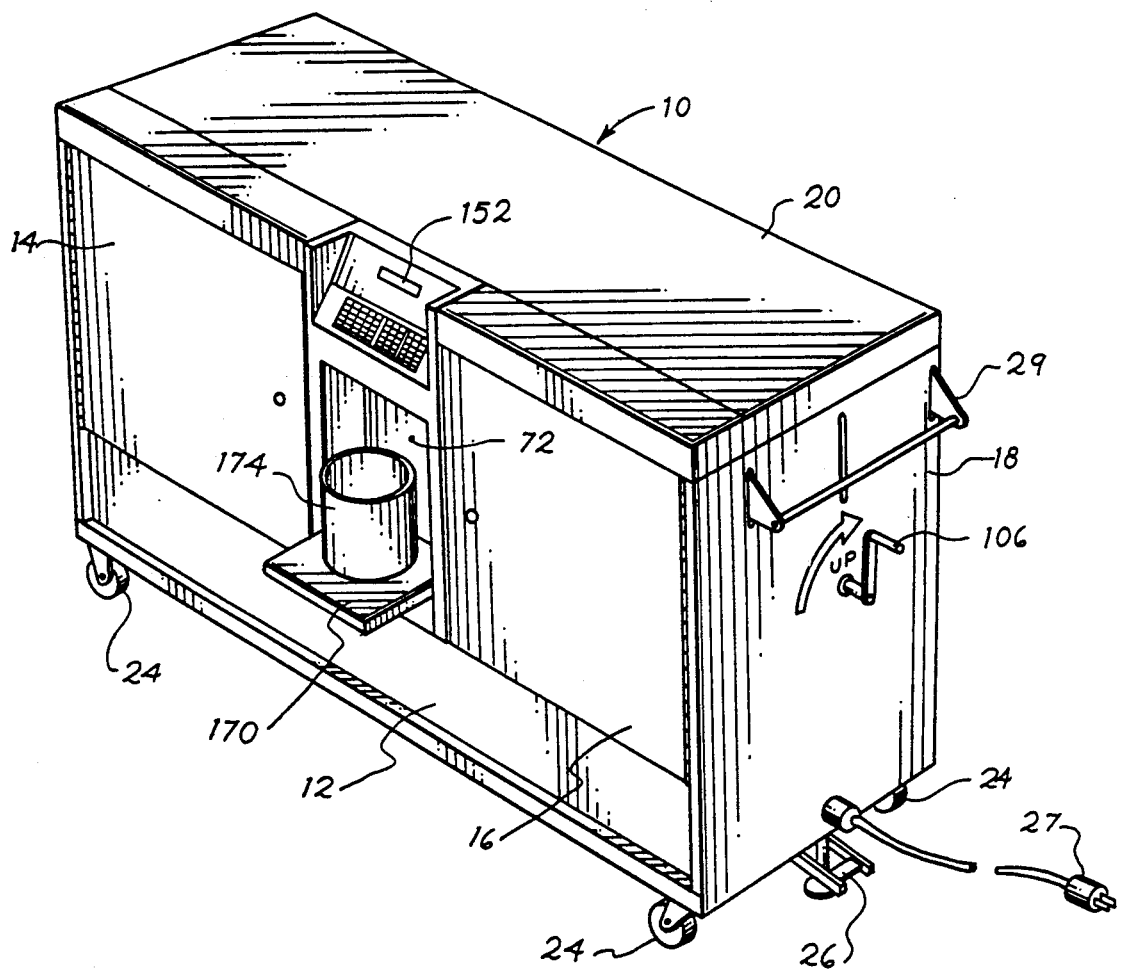
FIG. 1 is a perspective view of vehicular dispensing apparatus according to principles of the present invention.

Referring now to the drawings, and initially to FIG. 1, vehicular dispensing apparatus is generally indicated at 10. As will be seen herein, the body of the apparatus includes an open frame inner construction, and is covered by a hinged access door 12, front panels 14, 16, end panels 18 and a top covering panel 20. The apparatus 10 resembles a cart, having wheeled casters 24 at each corner and a floor brake 26 at one end. An electrical connector 27 provides power for the operation of equipment mounted within the cart. Handles 29 are located on end panels 18 for maneuvering the wheeled cart. If desired, motorized traction apparatus could be added to the cart, although such has not been found to be necessary.

Figure 7:
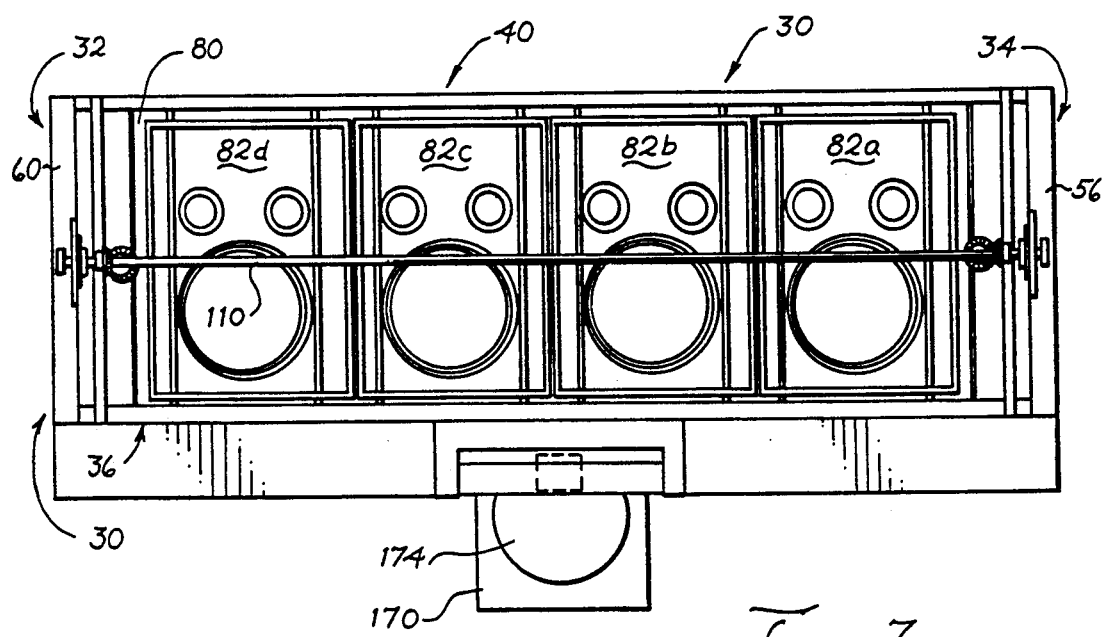
FIG. 7 is a top plan view of the vehicular apparatus with the outer covering removed.
Figure 8:
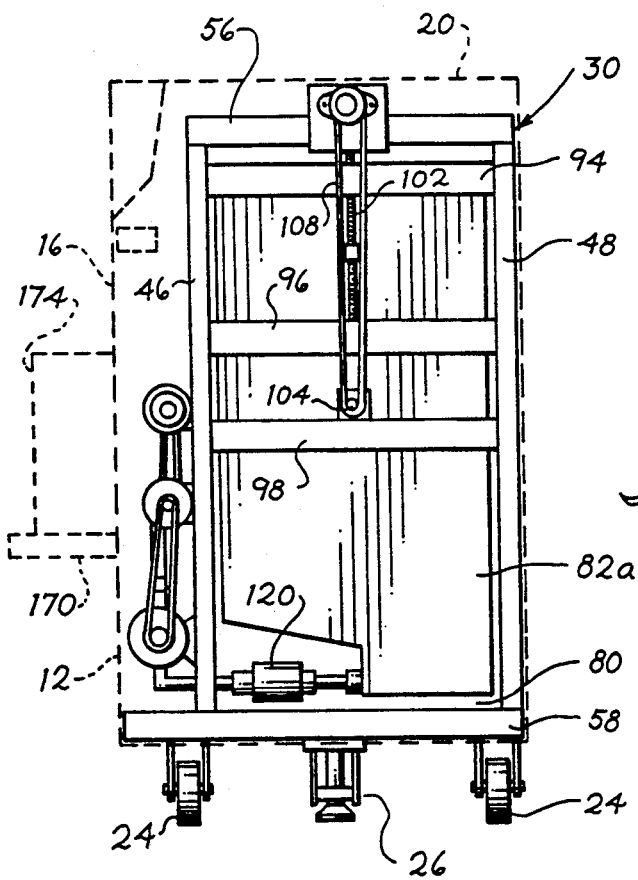
FIG. 8 is an end elevational view of the vehicular dispensing apparatus with the outer covering removed.

As can be seen in FIGS. 2, 3, 7 and 8, for example, apparatus 10 includes an inner frame, generally indicated at 30, of open framework or girder construction, being constructed of elongated channels and the like structural members. With reference to FIG. 7, the inner frame 30 includes endwalls 32, 34 and a mounting wall 36 extending between the endwalls. The open framework construction is visible in FIG. 2 which clearly shows an upper support frame 40 extending between the endwalls 32, 34 at the upper end of the apparatus.

In the preferred embodiment, the various structural members comprising the inner frame 30 are shared between the various framework walls referred to above.

Figure 3:
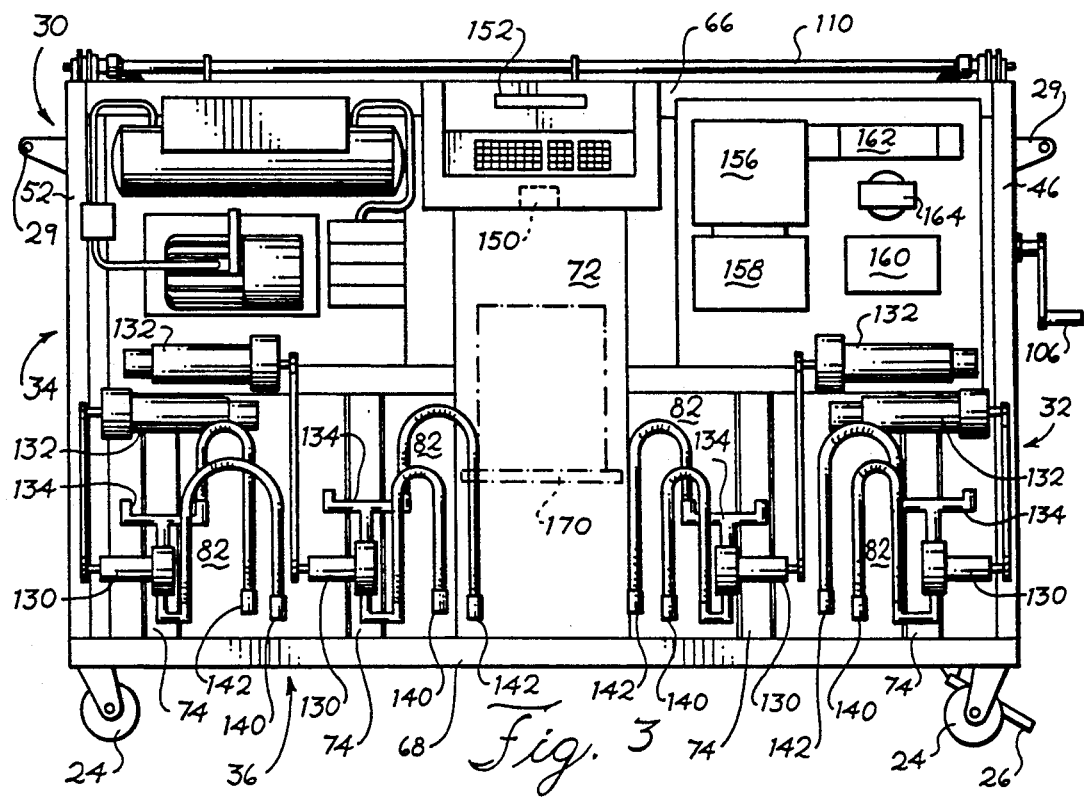
FIG. 3 is a front elevational view of the apparatus, shown with the outer cover removed.

For example, referring to FIG. 2, frame 30 is comprised of vertical corner posts 46, 48, 50 and 52. The corner post 46, for example, is shared between endwall 34 and the front or mounting wall 36. Endwall 34 further includes upper and lower horizontal members 56, 58. The upper frame member 56 is shared between endwall 34 and upper support frame 40. The opposed endwall 32, similarly, has upper and lower horizontal frame members 60, 62, respectively. Referring to FIG. 3, the mounting wall 36 includes upper and lower horizontal members 66, 68 extending between the endwalls 32, 34. An intermediate horizontal member 70 also extends between endwalls 32, 34 and supports a central column 72 on which control and nozzle equipment are located, as will be seen herein. Mounting wall 36 further includes stub members 74 which extend between the intermediate and lower supports 70, 60, respectively. Referring to FIG. 7, the mounting wall 36 is located to one side of endwalls 32, 34 and cooperates therewith, and optionally with the stationary upper support frame 40 to define a partially enclosed cavity 80 located behind mounting wall 36, for receiving bulk storage containers 82.

As can be seen in FIG. 2, four containers are employed in the preferred embodiment of the present invention. The cavity 80 extends substantially the entire width of frame 30 and comprises an unobstructed opening extending from the floor to the upper stationary support frame 40. Referring to FIG. 2, three of the four containers 82 are raised slightly off of the floor, with container 82b resting on the floor. FIG. 2 is drawn for purposes of illustrating the present invention. In use, all four containers are transported to the work site and are aligned in the configuration indicated in FIG. 2, resting o the floor. The vehicular dispensing apparatus 10 is then rolled over the containers 82 with the containers being received in cavity 80 to approximately the position illustrated in FIG. 2. As will be explained herein, the containers are thereafter raised off the floor and are carried with apparatus 10 to a desired work location.

Referring now to FIG. 2, apparatus 10 includes a lifting collar 88 of generally rectangular ring-like open construction. The lifting collar is generally aligned in a horizontal plane, and includes front and rear members 90, 92 and side members 94. The lifting collar is free to move within frame 30, passing between endwalls 32, 34, and immediately behind mounting wall 36.

Figure 4:
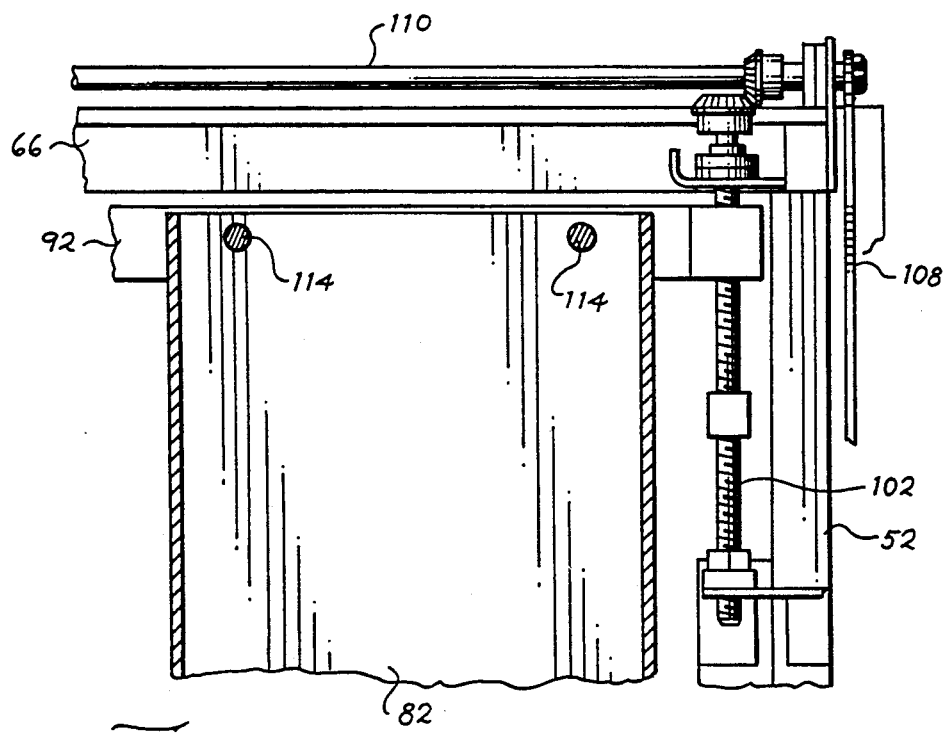
FIG. 4 is a fragmentary cross-sectional view thereof, showing the bulk containers in a fully raised position.
Figure 5:
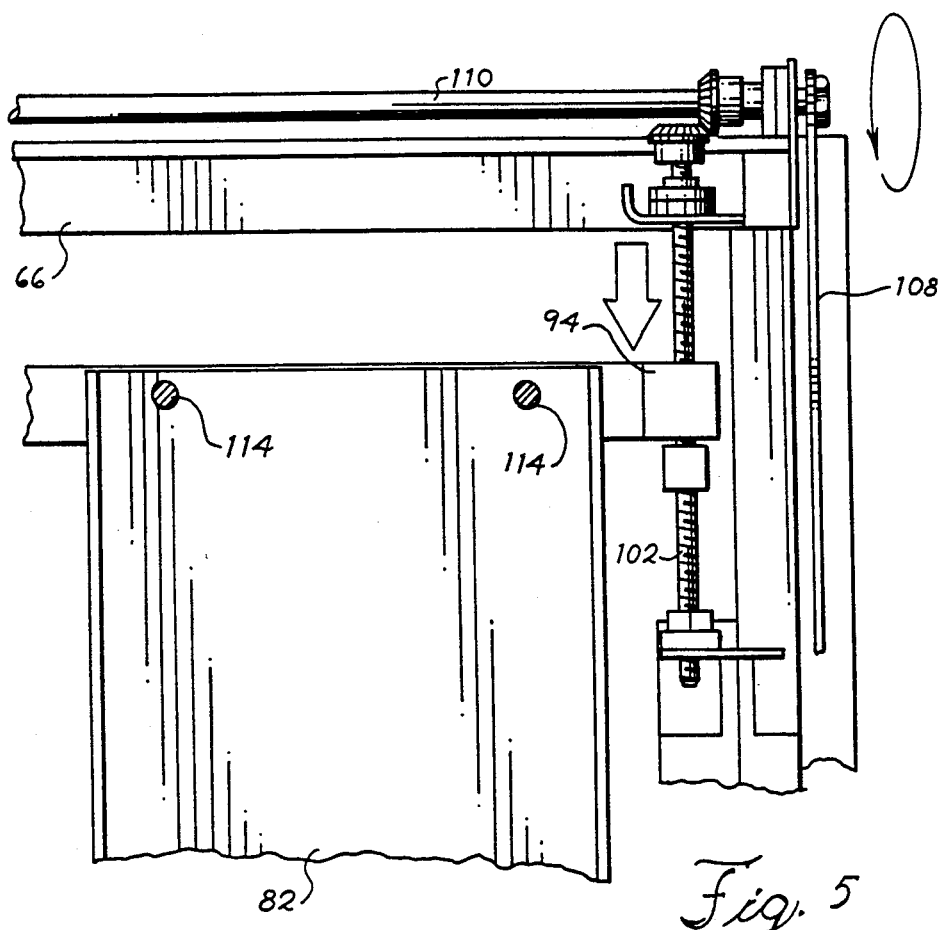
FIG. 5 is a view similar to that of FIG. 4, but showing the bulk container being lowered.
Figure 6:
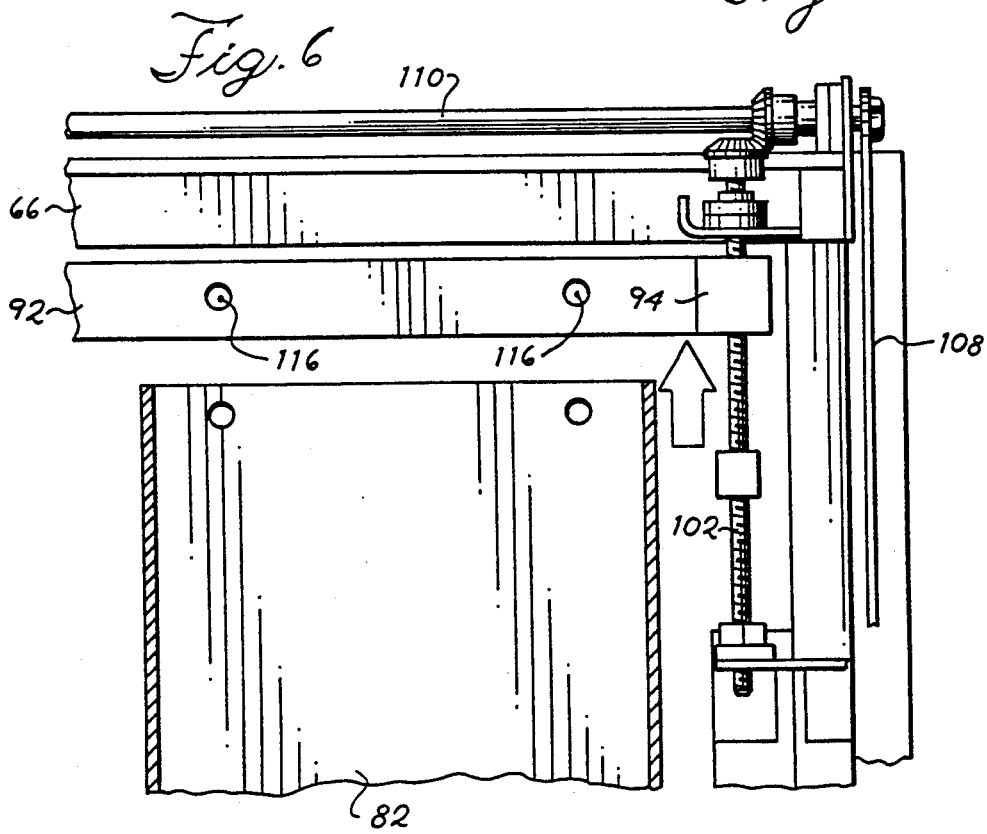
FIG. 6 is a view similar to that of FIGS. 4 and 5, but showing the bulk container being raised to an operational position.

Referring again to FIG. 2, frame 30 includes horizontal struts 96, 98 at each endwall for supporting lead screw 102 and crank 104, respectively. The crank 104 is driven manually via handle 106, visible in FIGS. 1 and 2, for example. The crank 104 drives a belt 108 which transmits power to a transmission shaft 110 located at the upper end of apparatus 10. As can be seen in FIG. 7, for example, transmission shaft 110 has angle gears located at each end, which mate with angle gears for each screw shaft 102, thus simultaneously driving the screw shafts together. Thus, by operating crank handle 106, the sides of lifting collar 88 are raised and lowered in the manner illustrated in FIGS. 4–6. The transmission shaft may be motor driven, if desired.

Referring again to FIG. 2, connecting rods 114 are used to couple containers 82 to lifting collar 88. The containers 82 have corner supports with apertures for receiving the connecting rods 114, and the lifting collar 88 is provided with apertures 116 for receiving the connecting rods 114. Other arrangements for releasably attaching the containers 82 to the lifting collar 88 can also be employed. The containers 82 are lifted in the manner illustrated in FIG. 6 to the operable position illustrated in FIG. 8, for example. In the preferred embodiment, the bulk containers 82 are of substantial size, and typically weigh hundreds of pounds apiece, when filled with product. The lifting collar and related apparatus provides a simple and effective way whereby one or two operating personnel can quickly and easily load a full complement of containers on the dispensing apparatus.

Referring now to FIG. 3, various equipment associated with metering and dispensing the product within containers 82 will be described. According to one aspect of the present invention, the metering and dispensing equipment is connected to the containers 82 in the manner indicated in FIG. 8 wherein the metering and dispensing equipment is shielded from inadvertent contact, being located on one side of mounting wall 36, with containers 82 mounted on the opposite side of the mounting wall. Further, the metering and dispensing equipment is connected to containers 82 with quick-release couplings 120, with a pair of couplings provided for each container, so as to provide a recirculation of product through the container and metering and dispensing apparatus.

The couplings 140, 142, as mentioned, are of the quick-disconnect type and preferably are polarized or otherwise keyed to one of two types of container fittings so as to prevent contamination of a module previously employed with one part of the composition, from becoming contaminated with a second part of the two-part composition. In the preferred embodiment, each tank 82 is filled with a single part of the two-part composition, one pair of mixing and dispense modules being needed for a mixing operation.

Upon studying FIG. 3, it can be seen that four similar modules are provided, one associated with each container. Each module contains a pump 130, motor 132 for driving the pump, and a valve 134. Preferably, the valve is of a three-way type and is pneumatically operated. An air compressor 136 and tank 138 are provided for the pneumatic control. Each module also includes a quick-release inlet coupling 140 coupled to a respective pump 130, and a quick-release outlet coupling 142 coupled to a respective valve 134.

In the preferred mode of operation, the pumps 130 provide recirculation of product through the tanks 82 prior to a metering event. The product is circulated through the valves 134 which are coupled to their respective pumps 130. The piping from the valves 134 to a dispense head or nozzle 150 is located at the upper part of central column 72. The nozzle 150 is located immediately below a keyboard 152 which is associated with a central processing unit module 156 and an input-/output or I/O module 158, power supply modules 160, 162 and transformer 164. With the computer control provided, an operator need only select the desired quantity of finished product to be dispensed, and initiate a mixing and dispensing operation. The computer program stored in the CPU module 156 is set for a particular type of composition, and contains a predetermined formula for the mixing operation. The computer, through I/O module 158, controls the pneumatically operated valves 134 to provide a precisely controlled mixing in program-determined amounts so as to provide virtually any desired predetermined quantity of composition mixture. As can be seen in FIG. 1, a shelf 170 is provided on central column 72 for supporting a container 174 underneath the dispense head located immediately below keyboard and display unit 152.

In use, workmen will unload a full set of containers 82 on a floor, at or near a work site. The apparatus 10 is then wheeled into alignment over the containers, the lifting collar 88 is lowered and connecting rods 114 are inserted to connect the various containers to the lifting collar. Thereafter, the lifting collar and containers are raised to the operational position and the quick-release couplings 140, 142 are coupled to their respective tanks. The apparatus 10 is then wheeled to a desired location at the work site and workmen need only enter the desired amount of finished product desired. A mixture of the various parts of the multi-part composition is then dispensed at head 150 into a suitable size container 174.

As will be appreciated, the computer control of the mixing operation can account for different environmental conditions, such as temperature and humidity, as may be currently experienced at a work site, and can require the mixing ratio to be altered or that additives be introduced into the mixture. All such subtle refinements will, of course, be unnoticed by a workman who need only be concerned with the amount of product desired.

For example, if a floor is being coated with a multi-part composition, a workman will typically make several trips back and forth to apparatus 10, carrying convenient-sized portions of a blended composition as work on a portion of the floor progresses. Eventually, the only portion of the floor remaining to be coated by a particular workman will be of a relatively small size, and if only a correspondingly small amount of composition is required, the exact amount desired can be dispensed by apparatus according to principles of the present invention.

As a tank is emptied, operations may be switched over to reserve tanks carried in apparatus 10 or alternatively, the tanks may be lowered to the ground by lowering lifting collar 88, and wheeling apparatus 10 away from the tanks, thus allowing their return to the manufacturer for cleaning and refilling of the bulk containers 82. Thus, additional advantages are obtained in that disposal of individual standardized one-gallon or five-gallon containers is no longer required.

As illustrated above, the preferred configuration of the containers 82 is that of a generally rectangular construction, with mutually orthogonal rectangular cross-sectional configurations. Further, the preferred configuration of containers 82 is that of an elongated vertical crosssection. Other configurations of containers 82 are, of course, possible. For example, a plurality of containers may be stacked one on top of another, each container having a horizontally elongated configuration. Other nonrectangular configurations are, of course, possible.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Liquid dispensing apparatus for transporting at least one liquid container having an upper end and means at the upper end for lifting the container and for dispensing the contents of the liquid container, comprising:

vehicular frame means rollable from place to place, having a pair of end walls, and a mounting wall and top wall between the end walls and cooperating therewith to define a partially enclosed cavity for receiving a container when the frame means is rolled over the container;

metering and dispensing means carried on said frame means including means for coupling to a container;

a lifting collar carried on said vehicular frame means so as to be raised and lowered toward and away from the container;

attaching means for releasably attaching the container to said lifting collar; and lifting means associated with said vehicular frame means for selectively lowering said collar adjacent said container upper end and for raising said collar and container in preparation for transport of said container.

2. The apparatus of claim 1 wherein said attaching means comprises an elongated shaft extending between the upper end of said liquid container and said lifting collar.

3. The apparatus of claim 1 wherein said frame means further includes a top support member above said cavity and extending between said end walls, and said lifting means comprises winch means carried on said top member for raising and lowering said lifting collar.

4. The apparatus of claim 1 wherein the metering and dispensing means includes pump means, valve means and recirculation means including a pair of hoses connected at one end to a lower end of said liquid container and connected at another end to at least one of said pump means and said valve means.

5. The apparatus of claim 1 wherein said lifting means comprises a transmission shaft extending between said end walls and screw shaft means adjacent each end wall, coupled to said transmission shaft and to opposed ends of said lifting collar, and rotating means for rotating said transmission shaft so as to displace opposed ends of said lifting collar 6. The apparatus of claim 5 wherein said rotating means comprises a manually engageable handle.

7. Apparatus for dispensing liquid from a container having an upper end and means at the upper end for releasable attachment to a lifting means for lifting the container, comprising:

frame means including a pair of spaced end walls for engaging supporting floor means and a mounting wall extending between the end walls, the mounting wall having first and second opposed sides with a second side of said mounting wall and said end walls defining a partially enclosed cavity, and said frame means further including a top support member extending between the end walls so as to define an upper end of the cavity;

metering and dispensing means mounted on a first side of said mounting wall including connecting means for connection to a liquid container carried by said apparatus;

a lifting collar in said cavity carried on said vehicular frame means;

attaching means for releasably attaching the liquid container on said floor means to said lifting collar; and lifting means associated with said vehicular frame means for selectively lowering said collar adjacent the container upper end and for raising said collar and container above said floor means in preparation for connection to said connecting means, with said mounting wall shielding said metering and dispensing means from inadvertent contact with said lifting collar or liquid container.

8. The apparatus of claim 7 wherein said frame means includes wheel means for rolling said frame along the floor means, over a liquid container resting on said floor means, so that the liquid container is received in said frame cavity in alignment with said lifting collar.

9. The apparatus of claim 8 wherein said lifting means comprises a transmission shaft extending between said end walls, screw shaft means located adjacent each end wall and coupled to said transmission shaft and to opposed ends of said lifting collar, and rotating means for rotating said transmission shaft so as to displace opposed ends of said lifting collar.

10. The apparatus of claim 8 wherein said connecting means comprise releasable coupling means extending from the first side of the mounting wall to the cavity for releasable connection to the liquid container.

11. The apparatus of claim 10 wherein the metering and dispensing means includes pump means, valve means and recirculation means including a pair of hoses connected at one end to a lower end of said liquid container and connected at another end to at least one of said pump means and said valve means.

* * * * *

UNITED STATES PATENT AND TRADEMARK OFFICE
CERTIFICATE OF CORRECTION

PATENT NO. : 5,193,720

DATED : March 16, 1993

INVENTOR(S) : Mayberry

It is certified that error appears in the above-identified patent and that said Letters Patent is hereby corrected as shown below:

```
    Column 1, line 60, change "ar" to --are--.
    Column 2, line 32, after "vehicular" insert --dispensing--.
    Column 3, line 35, change "o" to --on--.
    Column 5, line 50, change "crosssection" to
--cross section--.

Claim 5, Column 6, line 44, after "collar" insert a period.
```

Signed and Sealed this

Fifteenth Day of February, 1994

Attest:

BRUCE LEHMAN

*Attesting Officer*      *Commissioner of Patents and Trademarks*